(12) United States Patent
Camilleri et al.

(10) Patent No.: US 11,344,951 B2
(45) Date of Patent: May 31, 2022

(54) APPARATUS FOR FORMING 3D OBJECTS

(71) Applicant: Effusiontech Pty Ltd, New South Wales (AU)

(72) Inventors: Steven Camilleri, Northern Territory (AU); Lyell Embery, Northern Territory (AU); Toby Jarrett, Victoria (AU); Byron Kennedy, Victoria (AU)

(73) Assignee: Effusiontech Pty Ltd, New South Wales (AU)

( * ) Notice: Subject to any disclaimer, the term of this patent is extended or adjusted under 35 U.S.C. 154(b) by 202 days.

(21) Appl. No.: 16/307,457

(22) PCT Filed: May 15, 2017

(86) PCT No.: PCT/AU2017/050442
§ 371 (c)(1),
(2) Date: Dec. 5, 2018

(87) PCT Pub. No.: WO2017/210718
PCT Pub. Date: Dec. 14, 2017

(65) Prior Publication Data
US 2019/0344343 A1    Nov. 14, 2019

(30) Foreign Application Priority Data
Jun. 6, 2016   (AU) .................. 2016902183

(51) Int. Cl.
*B22F 10/10* (2021.01)
*B33Y 30/00* (2015.01)
*B33Y 50/02* (2015.01)

(52) U.S. Cl.
CPC .............. *B22F 10/10* (2021.01); *B33Y 30/00* (2014.12); *B33Y 50/02* (2014.12)

(58) Field of Classification Search
CPC .............. B22F 3/008; B22F 2003/1057; B22F 2998/10; B22F 2003/1056; B22F 3/003;
(Continued)

(56) References Cited

U.S. PATENT DOCUMENTS

| 2010/0143700 | A1 | 6/2010 | Champagne et al. |
| 2015/0056465 | A1* | 2/2015 | Zahiri ................ C23C 30/00 428/553 |
| 2017/0297097 | A1* | 10/2017 | Gibson ............. B33Y 80/00 |

FOREIGN PATENT DOCUMENTS

| CN | 104985813 | 10/2015 |
| WO | WO2013149291 | 10/2013 |

(Continued)

*Primary Examiner* — Joseph S Del Sole
*Assistant Examiner* — Mohamed K Ahmed Ali
(74) *Attorney, Agent, or Firm* — Lee & Hayes, P.C.

(57) ABSTRACT

An apparatus for forming 3D objects from metallic powder, includes a delivery mechanism adapted to emit a flow of metallic powder at sufficiently high velocity to enable it to form a solid mass on a substrate; and a positioning mechanism adapted to set or adjust the distance and/or angle between the delivery mechanism and the substrate as powder builds up on the substrate. A control system is adapted to receive measured geometry data representing the state of the object as it builds and to control adjustment of the positioning means in response to that data for accurate formation of the object.

15 Claims, 2 Drawing Sheets

(58) Field of Classification Search
CPC ........ B22F 3/02; B22F 3/1055; B05B 13/041;
B05B 13/0473; B05B 7/14; B29C 64/227;
B29C 64/241; B29C 64/40; B29C 64/379
See application file for complete search history.

(56) References Cited

FOREIGN PATENT DOCUMENTS

| WO | WO-2015073322 A1 * | 5/2015 | ........... B29C 64/379 |
|----|-----|-----|-----|
| WO | WO2015157816 | 10/2015 | |
| WO | WO2016197208 | 12/2016 | |
| WO | WO2017210718 | 12/2017 | |

* cited by examiner

APPARATUS FOR FORMING 3D OBJECTS

FIELD OF INVENTION

This invention relates to apparatus for forming 3D objects from a stream of metallic powder.

BACKGROUND

It is known to cold spray metallic powder at rates of 500 to 1,000 ms$^{-1}$ onto objects to give them a protective coating. However for all functional purposes these are only 2D surface coatings and are not used to provide 3D features. Known devices for applying the 2D coatings are not able to control the relationship between the path of the powder and the object it contacts sufficiently to enable production of 3D features. It has not occurred to those in the art to develop a 3D production technique based on sprayed metallic powder. This is possibly because in a stream of powder the particles at the centre of the stream tend to move at a greater velocity than those at the fringes, with the result that particle deposition is not uniform. While this is not a concern for a 2D coating, it makes it impractical for forming 3D objects.

To elaborate, due to the higher velocities of particles in the center of a spray cross-section, and the lower velocities at the periphery of a spray cross-section, conical structures may tend to form at an interface between the substrate and the stream of powder. As the surface angle presented by the deposited material and the stream is believed to be a critical factor to the rate of deposition, this conical arrangement may slow or otherwise hinder effective deposition. As a result, the act of holding a spray stationary over a single point in the substrate may results in a conical shape which builds briefly and then ceases as remaining powder particles simply bounce off the angled sides of the cone. The applicant has discovered that by appropriately controlling the disposition of a substrate with respect to a powder stream, a targeted 3D object can be conveniently formed.

The term "comprising" if and when used in this document in relation to a combination of features or steps should not be taken to rule out the option of there being other features or steps. The term should not be interpreted in a limiting way.

SUMMARY OF INVENTION

According to one aspect of the invention there is provided apparatus for forming 3D objects from metallic powder, comprising:
  delivery means adapted to emit a flow of metallic powder at sufficiently high velocity to enable it to form a solid mass on a substrate; and
  positioning means adapted to set or adjust the distance and/or angle between the delivery means and substrate as the powder builds up on the substrate; and
  control means adapted to control adjustment of the positioning means as the object builds.

The substrate may or may not form part of the apparatus and, in cases where it is not, it is nonetheless mentioned for ease of definition of other components. The substrate may be a base on which the object is formed, a 3D template for a new object, or a 3D object already formed but which needs to be modified or repaired.

Optionally the delivery and positioning means may be different parts or aspects of the same component. As a further option they may be separate components.

Optionally the powder moves from the delivery means to the substrate at a speed of approximately 200 to 2000 m/s.

Optionally the powder comprises pure or alloyed metal powder, atomized to an average size of between 5 and 50 microns in diameter.

Optionally the powder comprises commercially available metal powder, such as copper or aluminium powders, eg −325 mesh and water atomized. Grade 123 pure Aluminium Powder from Alcoa Corporation is considered a suitable for at least some preferred embodiments of the invention.

Optionally the powder is supplied to the delivery means at between 0° C. and 500° C. (eg between 0° C. and 300°).

Optionally the powder is supplied to the delivery means at between room temperature (eg 25° C.) and 500° C. (eg between 0° C. and 300°).

Optionally the positioning means is able to move the substrate with respect to the delivery means. In some embodiments the positioning means may be able to move the delivery means with respect to the substrate.

Optionally the positioning means is able to maintain or adjust the vertical and horizontal spacing between the delivery means and the substrate.

Optionally the positioning means is able to maintain or adjust the angular relationship between the delivery means and the substrate in at least two axes.

Optionally the apparatus is adapted to form the 3D object by applying a sequence of layers wherein each layer is formed from the metallic powder.

Optionally the delivery means comprises a spray nozzle.

Optionally the positioning means comprises an arm having means to grip the substrate.

Optionally the control means comprises a computerised system adapted to send control signals to the delivery means and the positioning means dependent on the 3D object to be formed.

Optionally the delivery means comprises a cold spray nozzle.

Optionally the apparatus includes a housing adapted to prevent or minimise egress of powder from the apparatus.

Optionally the apparatus incorporates a 3D scanner to provide the geometry data to the control means and, based on that data, the control means causes the delivery means and the positioning means to adjust for accurate formation of the object.

Optionally the positioning means incorporates a substrate gripper which facilitates automated ejection of the object when complete.

Optionally the positioning means comprises screw or belt driven axes of motion mounted on linear guide rails, otherwise known as computer numerical controlled (CNC) axes, mounted either to the substrate or the delivery means, the other being held stationary, or where both the substrate and the metal powder supplying device are mounted to separate CNC motion controlled axes.

DRAWINGS

Some preferred embodiments of the invention will now be described by way of example and with reference to the accompanying drawings, of which:

DETAILED DESCRIPTION

Figure 1:
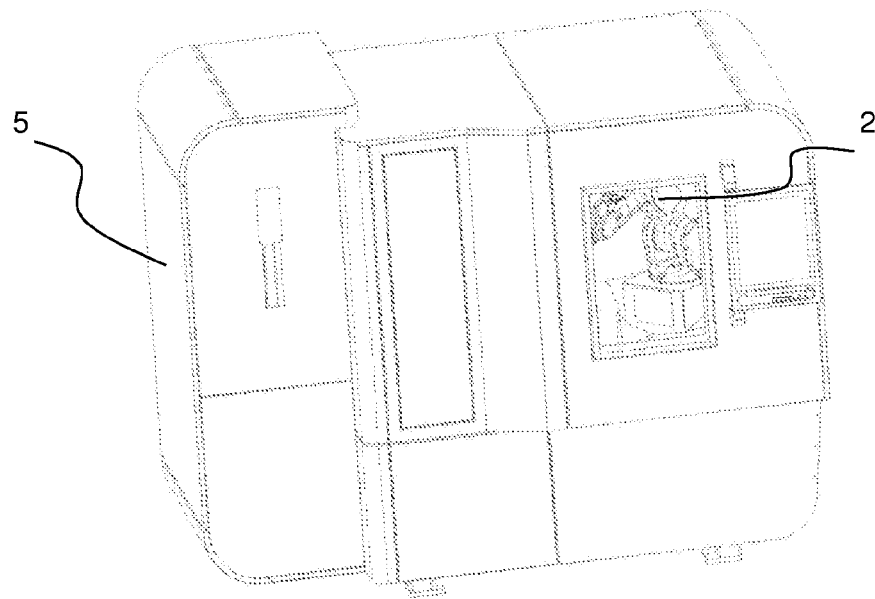
FIG. 1 is an isometric view of a 3D printer.
Figure 2:
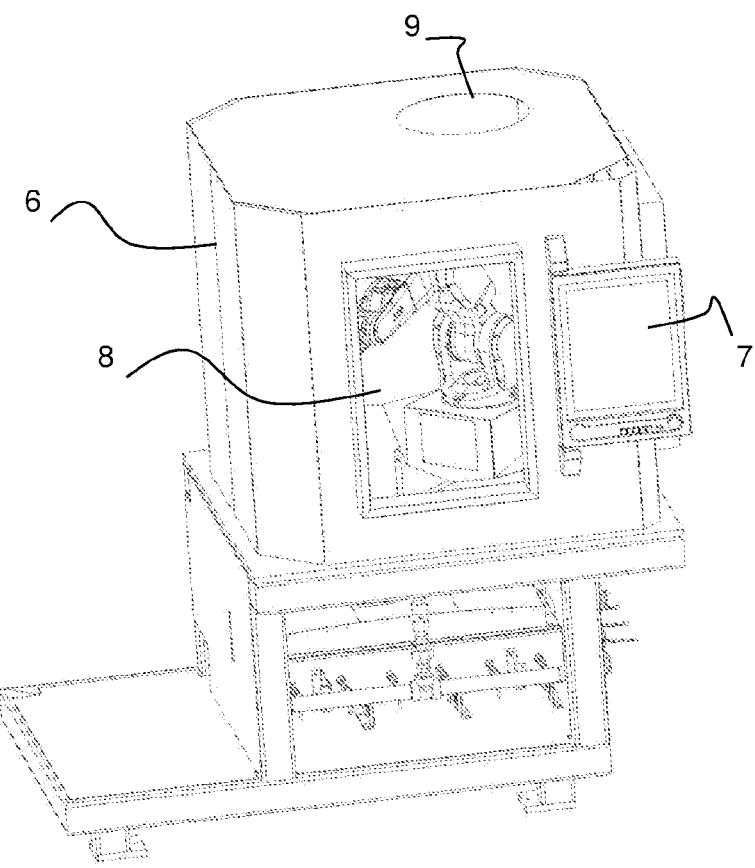
FIG. 2 is an isometric view showing certain internal parts of the printer.
Figure 3:
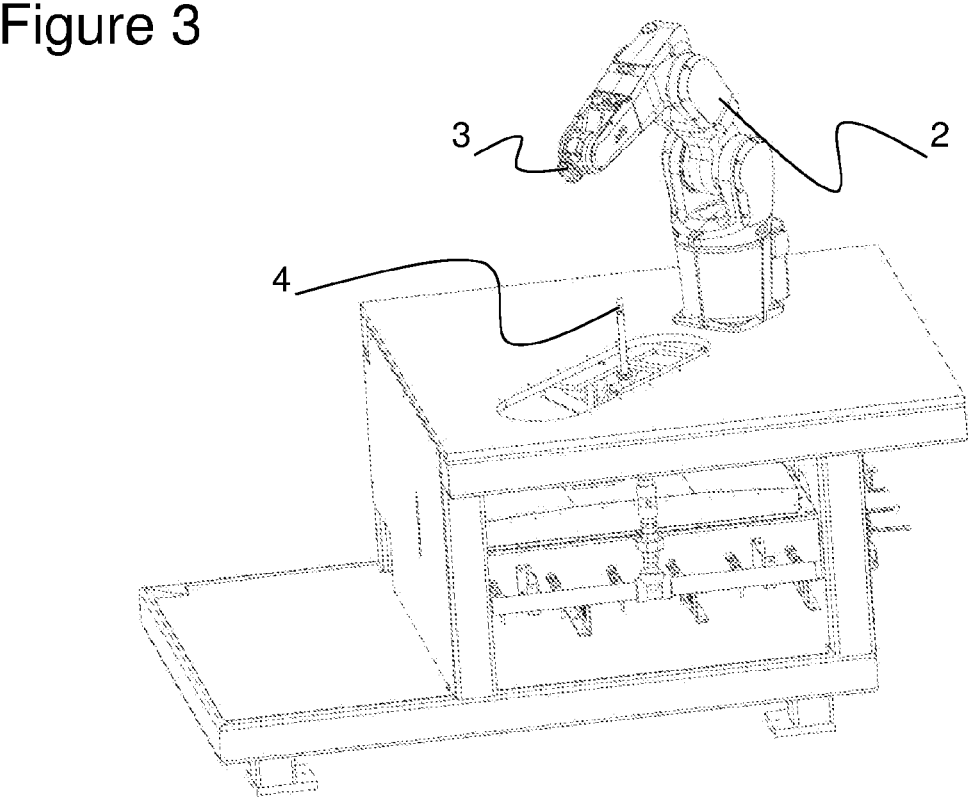
FIG. 3 is an isometric view showing detail of some parts of the printer.

With reference to FIGS. 1-3, and particularly FIG. 3, the 3D printer 1 has a robotic arm 2 having a grip 3 for holding a substrate (not shown), and a spray nozzle 4. When the printer is in use a substrate is held by the grip 3 and a high velocity flow of heated pressurised air is emitted from the nozzle 4. A feeder feeds metallic powder to the air so that it also leaves the nozzle at high velocity and contacts the substrate. The arm 2 is adjustable so that the metallic powder moves in a vector of desired distance and angle so that it contacts the substrate in a manner suited to forming a desired product. As layers of the powder build up on the substrate the arm 2 reorients to maintain or adjust the desired distance and angle to the substrate.

Referring to FIG. 1, the printer is housed within an easily managed enclosure 5. FIG. 2 illustrates the printer without the enclosure, and in particular within a build chamber 6. The build chamber supports a computerised system with an interface 7 for setting and providing manually generated or automatic computerised control commands to the robotic arm 2 and spray nozzle 4. The chamber 6 has a window 8 for conveniently viewing the printer when in use and an upper vent 9 to allow for escape of hot air.

The computerised system may be adapted to interpret CAD drawings and use these to determine the type and number of control signals sent to the robotic arm 2 and spray nozzle 4.

Figure 4:
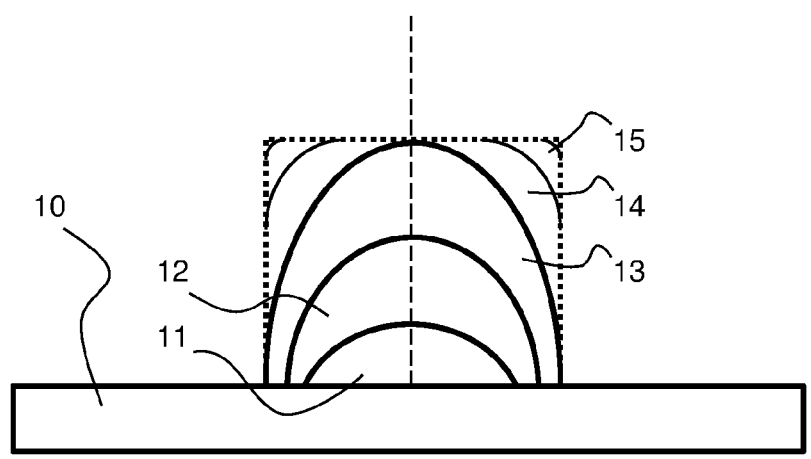
FIG. 4 illustrates the manner in which an object may be formed by way of the printer.

FIG. 4 schematically illustrates a substrate 10 on which a cylinder has been formed about an axis 6. The cylinder has been created in powder deposition steps or layers 11-15. As illustrated, the cylinder has not been built in a directly linear manner by rather in an 'inflated' manner, where each layer combines to produce the overall linear vertical dimension.

The 3D printer is preferably formed to work at high speed and so that it can print metallic objects accurately from the powder with minimal restrictions in terms of the geometry of the objects.

Preferably the robotic arm 2 causes a beam of the metal powder to moves across the surface of the substrate so that the beam remains substantially perpendicular to its point of contact of the substrate or a part formed on the substrate. This is enabled by the control functions of the printer's computerised system. The printer also enables the angle of the beam to be reoriented to less than perpendicular if need be, for example in order to form the desired 3D shape.

In some embodiments of the invention the robotic arm 2 may comprise a five axis CNC frame or a six axis industrial arm. The selection of one or the other may depend on whether speed or accuracy is the most important consideration.

In a preferred embodiment the build chamber 6 serves to physically contain excess powder to enable it to be collected and reused or recycled. The chamber 6 also keeps powder away from nearby equipment that can be damaged by exposure to the powder.

In some embodiments of the invention the amount of excess powder is sensed and control parameters adjusted to reduce it, and therefore the risk of associated hazards.

In some embodiments of the invention the printer has a 3D surface scanner within the build chamber 6. This is preferably located within reach of the robotic arm 2 and allows the printer to check the build level of an object during powder deposition breaks.

In preferred embodiments of the invention it is desirable for the substrate or spray nozzle 4, or both, to be attached to a motion control system that can continuously reorient and maintain the angle of attack of the beam of powder generally perpendicular. In addition, a sophisticated digital control system may process a targeted 3D object geometry and generate appropriate tool paths that facilitate deposition to result in a 3D item that best matches the targeted geometry.

While some preferred embodiments have been described by way of example it should appreciated that modifications and improvements can occur without departing from the scope of the invention.

The invention claimed is:

1. An apparatus for forming 3D objects from a metallic powder comprising:
a delivery mechanism including a cold spray nozzle, the cold spray nozzle configured to emit a beam of metallic powder at a velocity to enable the metallic powder to form a solid mass on a substrate;
a positioning mechanism including a robotic arm including a five axis computer numerical controlled (CNC) frame or six axis industrial arm, the robotic arm securing and moving the substrate with respect to the delivery mechanism, so as to set or adjust a distance or an angle between the delivery mechanism and the substrate as the metallic powder builds up on the substrate;
a control system including a computerized system to send control signals to the delivery mechanism and the positioning mechanism dependent on a 3D object to be formed, the control system configured to cause the positioning mechanism to continuously reorient and maintain a perpendicular angle of attack of the beam of the metallic powder as the 3D object forms from the metallic powder, wherein a function of defining a geometry of the 3D object is moved entirely to the control system such that the five axis CNC frame or the six axis industrial arm produces a motion in accordance with the geometry of the 3D object unconstrained by a geometry of the delivery mechanism and unconstrained by a geometry of the positioning mechanism.

2. The apparatus according to claim 1, wherein the metallic powder moves from the delivery mechanism to the substrate at a speed of 200 m/s to 2000 m/s.

3. The apparatus according to claim 1, wherein the metallic powder comprises a pure metal powder or an alloyed metal powder, atomized to an average size of between 5 and 50 microns in diameter.

4. The apparatus according to claim 1, wherein the metallic powder is at a temperature of between 0° C. and 500° C.

5. The apparatus according to claim 1, wherein the positioning mechanism maintains or adjusts a vertical and a horizontal spacing between the delivery mechanism and the substrate.

6. The apparatus according to claim 1, wherein the positioning mechanism maintains or adjusts an angular relationship between the delivery mechanism and the substrate in at least two axes.

7. The apparatus according to claim 1, wherein the robotic arm secures and moves the substrate with respect to the delivery mechanism such that the 3D object is formed by applying a sequence of layers, wherein each layer of the sequence of layers is formed of the metallic powder.

8. The apparatus according to claim 1, wherein the positioning mechanism further includes a gripping mechanism to grip the substrate.

9. The apparatus according to claim 1, wherein the computerized system sends control signals to the delivery mechanism and the positioning mechanism dependent on the 3D object being formed.

10. The apparatus according to claim 1, further comprising a housing disposed around the cold spray nozzle and the robotic arm prevents or minimizes egress of the metallic powder from the apparatus.

11. The apparatus according to claim 1, further comprising a 3D scanner to provide geometry data to the control system and, based on the geometry data, the control system causes the delivery mechanism and the positioning mechanism to adjust for accurate formation of the 3D object.

12. The apparatus according to claim 1, wherein the positioning mechanism further includes a substrate gripper which facilitates automated ejection of the 3D object when complete.

13. The apparatus according to claim 1, wherein the positioning mechanism further includes a screw or a belt driven axes mounted on linear guide rails, mounted either to the substrate or to the delivery mechanism, one or the other being held stationary, or where both the substrate and the delivery mechanism are mounted to separate axes.

14. The apparatus according to claim 1, further comprising a 3D scanner located proximate to the robotic arm such that during a time of not emitting the beam of metallic powder and not building up the metallic powder on the substrate secured on the robotic arm, the 3D scanner scans the 3D object to determine geometry data of the 3D object, and provides the geometry data to the control system and, based on the geometry data, the control system causing the delivery mechanism and the positioning mechanism to adjust for accurate formation of the 3D object.

15. The apparatus according to claim 1, wherein the robotic arm is a sole robotic arm including a sole five axis computer numerical controlled (CNC) frame or a sole six axis industrial arm, and wherein the function of defining the geometry of the 3D object is moved entirely to the control system such that the sole five axis CNC frame or the sole six axis industrial arm produces the motion in accordance with the geometry of the 3D object unconstrained by the geometry of the delivery mechanism and unconstrained by the geometry of the positioning mechanism.

* * * * *